United States Patent Office 3,354,288
Patented Nov. 21, 1967

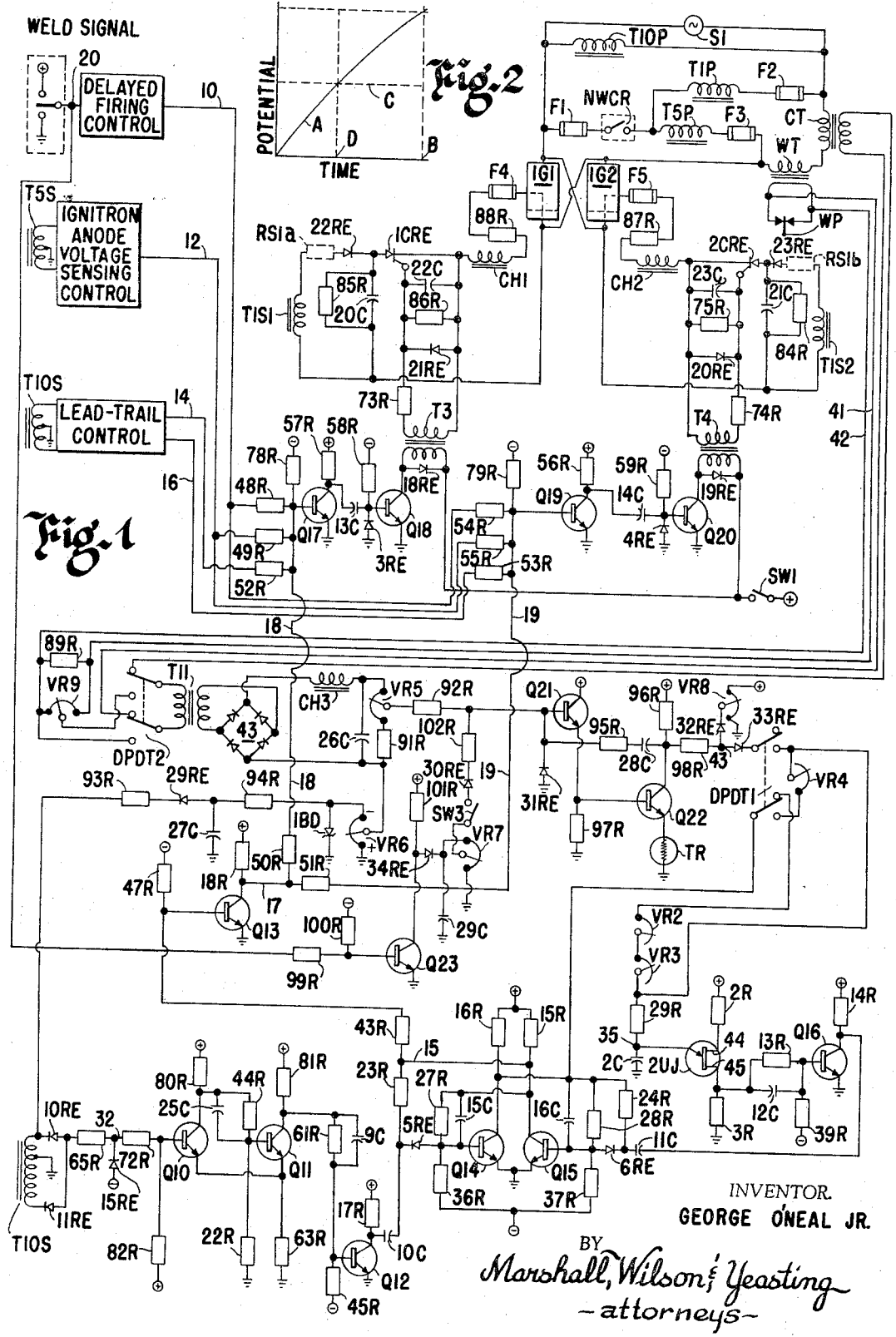

3,354,288
CONTROL APPARATUS
George O'Neal, Jr., Detroit, Mich., assignor to Weltronic Company, Southfield, Mich., a corporation of Michigan
Filed Aug. 30, 1963, Ser. No. 305,612
11 Claims. (Cl. 219—114)

ABSTRACT OF THE DISCLOSURE

A welding system having a firing circuit for a pair of anti-parallel connected unidirectional conductive devices which includes a feedback section for providing welding energy in a constant current mode or a constant voltage mode at the workpiece. An error signal is derived from combining a signal proportional to the weld current or weld voltage and a desired signal pattern. The error signal controls the firing circuit such that an increase in error signal decreases the weld energy by causing the firing circuit to fire later in the cycle and a decrease in error signal increases the weld energy. Thus the weld energy tends to be stabilized according to the desired pattern.

---

This invention relates to welding controls and more particularly to an improved regulating control for primary welding current or welding electrode voltage.

It is frequently desired to operate resistance welders in a constant current mode to maintain constant secondary current and thus maintain uniform metallurgical characteristics in the resultant welds. During the operation of welding equipment variations in the current supplied to the weld are encountered due to variations in line voltage or in the resistance of the weld circuit as where different contact resistances are experienced from one weld to the next or there are changes in the inductive relationship of the work piece to the welding current path. There are also advantages in weld uniformity to be derived from performing resistance welding operations in a constant welding electrode voltage mode since this mode enables a constant current density to be maintained in the weld area of the work piece. Constant current density is desired where the resistance between work pieces varies as where the completion of adjacent welds provide shunt paths for the weld current or the area of the welding electrodes changes with use.

Heretofore it has been known to monitor welding electrode voltage and control weld time in resistance welding operations. In addition the magnitude of weld current has been controlled in response to secondary electrode voltage.

An object of the present invention is to improve the control of resistance welding equipment.

A second object is to simplify the equipment required to control resistance welding equipment.

A third object is to maintain the level of either the primary welding current or the welding electrode voltage with a simple, reliable and inexpensive control.

Another object is to control weld characteristics by comparing the welding parameters against a reference and altering those parameters to correct any deviation from a predetermined relation to that reference.

A further object is to adjust the point in the supply current cycle at which such current is applied to the welding circuit in accordance with the magnitude and sign of the deviation of a welding parameter from a reference level.

A particular object is to accomplish the aforenoted objects in a control circuit utilizing a minimum number of elements and utilizing solid state devices as the active control elements.

Another object is to improve the monitoring of the voltage drop across welding electrodes by suppressing the effect of an inductive pickup from the welding circuit.

In accordance with one illustrative embodiment of the invention, control of the firing point of unidirectional current conducting devices such as ignitrons supplying current to a welding transformer primary from a source of electrical energy of alternating polarity is accomplished by a control circuit employing solid state devices as the active control elements. A separate-excitation firing circuit for each ignitron comprising a source of energy such as a charged capacitor and a controllable means such as a silicon controlled rectifier is effective when actuated for applying a pulse of energy from the source to the igniter electrode of the ignitron. This controllable means is actuated by a pulse of energy from a circuit which can be inhibited by a signal from any of a plurality of subsidiary control circuits. One such control circuit operates in synchronism with the alternating source and is effective during each half cycle during the period the voltage signal is near its reference level to initiate a period of inhibition slightly in advance of the beginning of the half cycle and continue that period for an adjustable interval extending into the beginning of the half cycle. The length of that interval is controlled by a regulating circuit which is controlled by the welding current or voltage and thus the amount of welding current supplied by the ignitrons is increased if a decrease is sensed or is decreased if an increase is sensed.

One feature of the invention involves sensing welding electrode voltage by means of pickup contacts at the electrode work faces coupled by leads to an output through a low resistance which suppresses the signal inductively coupled to the welding circuit without detrimentally affecting the signal conductively applied to that circuit.

Another feature resides in comparing a feedback signal which can be developed by monitoring either the primary welding current or the welding electrode voltage with a reference signal and adjusting the firing interval according to the resultant error signal.

Another feature comprises imposing an initiating signal on the reference signal at the initiation of an operation being regulated to limit the initial controlling error signal. This feature limits the effect of the reference signal when no feedback signal is available at the onset of the operation.

A fourth feature is the utilization of a rate sensitive feedback signal in the regulator circuit to restrict the rate of change of the regulating signal.

A fifth feature includes a limiter which limits the level of the regulating signal. This limiter can be arranged advantageously to avoid a too abbreviated interval in the timer which defines the inhibiting interval.

The above and additional objects of this invention together with the features thereof will be more fully appreciated from the following detailed description when read with reference to the accompanying drawing in which:

FIG. 1 is a schematic circuit diagram of a resistance welding circuit and its control circuit utilizing one form of this invention, with certain controls shown in block diagram form; and FIG. 2 is a plot of the potential at the base of a transistor controlling the welding current in response to the controls of this invention.

The welding control under consideration here has been applied to a complete firing system for an ignitron controlled welder as disclosed in George O'Near, Jr., United States patent application Ser. No. 271,948 which was filed Apr. 10, 1963 and is entitled Control Apparatus. Accordingly in the interest of brevity, a substantial portion of the controls disclosed in that application are incorporated herein by reference and are represented in the drawing by suitably labeled blocks including the "delayed firing control," the "ignitron anode voltage control" and the "lead-trail control."

For convenience of illustration, the transformer windings have been illustrated in the drawing in a way to best illustrate the functions of those transformers and consequently the primary and secondary windings are shown separated. Common prefix designations have been employed in each case, however, to permit identification of which secondary windings are associated with which primary windings. Additionally, in the drawing, the sources of direct voltage have been indicated by a circle bearing a sign indicative of the polarity of the source. It is to be understood that in each case the other terminal of the source is assumed to be connected to ground. For convenience and clarity, voltage values have been referred to in the following description. It is to be understood that they are but representative.

In general, the circuits illustrated on FIG. 1 comprise a pair of ignitrons IG1 and IG2 (or other controlled contactor means) for selectively connecting a source of energy S1 to a welding transformer WT for controlling the application of energy to a workpiece WP which is to be welded. The ignitrons IG1 and IG2 are controlled by individual firing circuits including controlled rectifiers 1CRE and 2CRE. Those firing circuits are operated under the control of driving circuits including transistors Q17 and Q18, and transistors Q19 and Q20. Those driving circuits are, in turn, controlled by four separate circuits including a delayed firing system, an ignitron anode voltage sensing system, a lead-trail control circuit, and a heat control circuit comprising transistors Q10 to Q16. The heat control circuit while controllable manually can be automatically regulated by means of a circuit comparing the primary welding current or the secondary electrode voltage with a reference signal and advancing the switching point for welding current on the AC cycle for deviations below a given level or retarding the switching point for deviations above a given level. This latter circuit comprises the transistors Q21 through Q23.

In the customary present commercial practice, ignitrons, or the like, are customarily employed with so-called anode firing circuits in which the voltage applied across the ignitron also serves as the energizing or plate voltage for the controlling or firing device, such as a thyratron, in the firing circuit. In such systems, the peak line voltage, which can be high due to transients, is in large part applied directly across the firing device which has made it difficult satisfactorily to adapt the system to the use of solid-state firing devices in view of their sensitivity to voltage transients. If the rate of voltage rise is sufficient, as it can well be with line-voltage transients, the firing device can, improperly, fire even though there be no input signal.

In the present arrangement, the problems arising from the transient-voltage sensitivity characteristics of solid-state devices, such as silicon controlled rectifiers, are effectively solved by isolating the firing devices from the line. Specifically, a separate-excitation circuit is employed and filtering means are employed between the source of voltage and the device to suppress transient voltage peaks. As a further means, additional filtering means are or may be provided between that device and the ignitron to control the rate of increase of the igniter current.

Automatic regulation in the constant current or constant voltage mode is achieved by monitoring the primary welding current or the welding electrode voltage and converting the signal derive therefrom to a DC signal which is summed algebraically with a reference signal so that the net signal establishes a biasing level in the timing circuit controlling the switching of the welding current. The biasing level is increased to shorten the timing interval measured from the beginning of the AC power cycle from which welding current is derived when the monitoring signal diminishes with respect to the reference signal, thereby increasing the portion of the cycle during which welding current flows. Conversely, when the monitoring signal increases with respect to the reference signal the portion of the cycle in which welding current flows is decreased by decreasing the bias on the timing circuit. Adjustable controls in the regulation circuit provide a wide latitude in the selection of the firing angle of the ignitrons.

The two ignitrons IG1 and IG2 are connected in back-to-back or antiparallel relationship between the source S1 and the primary winding of the welding transformer WT, in a manner well known in the art. The operation of these ignitrons is controlled by firing circuits including devices 1CRE and 2CRE. To effectively preclude dangerous premature firing of the ignitrons, switch NWCR is actuated to indicate that the apparatus is prepared for welding. In a common practice, welder control circuits include a timer having a relay, often referred to as the "no-weld control relay," which is actuated upon initiation of the squeeze interval provided the apparatus is otherwise in condition to weld, and it is contemplated that the switch NWCR illustrated in FIG. 1 of the drawing may, and normally will be, a contact of that or of a counterpart relay. The no-weld-control relay may well not operate at a point of zero line voltage and could result in a transient signal which would improperly actuate the firing circuit. The illustrated circuits obviate this possible malfunctioning.

When switch NWCR is closed, a circuit is completed from the source S1, through that switch and through fuses F1 and F2 to energize the transformer primary winding T1P, which is inductively coupled to secondary windings T1S1 and T1S2 of that transformer. Secondary windings T1S1 and T1S2 are connected in out-of-phase relationship and the phase relationships of the several windings of that transformer are indicated by the dot placed adjacent one end of each of the windings T1P, T1S1 and T1S2 to denote those winding ends which are of the same polarity at a given instant.

When the voltage across winding T1P is such that the left-hand end of that winding is positive relative to the right-hand end, for example, the voltage induced across secondary winding T1S2 is such that its upper end is positive relative to its lower end. Under that condition, current flows in a circuit including resistor RS1$b$ and rectifier 23RE to charge capacitor 21C so that its upper electrode becomes positive relative to its lower electrode. As will be seen, the energy stored by capacitor 21C is utilized to fire ignitron IG2. Charging resistor RS1$b$ may be provided as a separate element, but in a constructed embodiment of the invention, the effective resistance of the secondary winding T1S2 was found to be adequate and resistor RS1$b$ is illustrated in dotted lines to connote that it represents the internal resistance of that winding.

It will be observed that during this same half cycle, the polarity of the voltage across secondary winding T1S1 is such that rectifier 22RE blocks current flow and hence capacitor 20C does not charge during this half cycle. However, during the subsequent half cycle, in which the polarity is reversed, capacitor 20C is charged in a manner similar to that above described in connection with capacitor 21C, in preparation for the firing of ignition IG1.

Thus, at the end of one full cycle of the current from source S1 following the operation of switch NWCR, both capacitors 20C and 21C are charged in preparation for the operation of the system. Until they charge, the firing circuits cannot actuate the ignitrons. This one-cycle delay serves as a safety measure to insure that the welding electrodes will have engaged the workpiece before welding current is applied to the welding transformer. In the customary timers, squeeze time must be initiated before switch NWCR will close and the necessity of charging capacitors 20C and 21C in order to enable the firing circuits to fire the ignitrons IG1 and IG2 requires that the squeeze time be at least one cycle in duration.

In the preferred arrangement, capacitors 20C and 21C are made sufficiently large to store a substantial amount of energy which may be abruptly discharged through the input circuits of the ignitrons. Once those capacitors are charged, this energy is available for application to those circuits, but cannot be so applied until the control rectifier devices 1CRE and 2CRE have a suitable gating potential applied to their control electrodes or gates.

Means are provided for applying gating pulses to the silicon controlled rectifier devices 1CRE and 2CRE in selectable timed relation to the voltage applied to the anodes of the ignitrons. When the gating signal is applied to controlled rectifier 2CRE (during the half cycle of the source voltage in which the anode of ignitron IG2 is positive relative to its cathode), that rectifier is rendered conductive to establish a discharging path for capacitor 21C through that rectifier, inductor or choke CH2, resistor 87R, fuse F5, through the igniter-cathode path in tube IG2 and back to capacitor 21C. In the preferred arrangement, capacitors 20C and 21C are preferably of substantial capacitance (such as 20 microfarads) so that a substantial amount of energy can be delivered to the input circuits of the ignitrons. It is a characteristic of the preferred controlled rectifiers 1CRE and 2CRE that when conduction is initiated by virtue of the application of an input signal to their gates, the termination of the gating pulse will not in and of itself terminate conductivity of those devices.

In response to the signal applied to the input circuit of ignitron IG2, that ignitron will conduct between its anode and cathode, producing energization of the welding transformer WT from the source S1 and a resultant application of a pulse of energy to the workpiece WP. In a similar manner, ignitron IG1 is rendered conductive at a selectable point in that half cycle during which its anode is positive relative to its cathode to similarly energize transformer WT to apply a pulse of energy to the workpiece WP.

It will be observed that the firing energy storage means, such as capacitor 21C, together with the resistance in its charging circuit, such as the illustrated internal resistance RS1b of transformer winding T1S2, constitute a resistance-capacitance low-pass filter or integrating network. As a result, if the line voltage abruptly and transiently changes, tending to induce a transient voltage peak across secondary winding T1S2, that resistance-capacitance network will effectively suppress the voltage peak from appearing at the controlled rectifier device 2CRE and effectively preclude any such transient from producing a sufficient rate of change of current to cause that device improperly to become conductive.

It will further be noted that the circuit including choke CH2 and the resistance in the discharging circuit for capacitor 21C, including resistor 87R, constitute a filter for limiting the rate of change of the discharge current of capacitor 21C so as to limit the magnitude of the current in the input circuit of the ignitron.

Resistors 84R and 85R, which are connected in parallel with capacitors 21C and 20C, respectively, are preferably of sufficiently large resistance so that they do not significantly affect the normal operation of the circuit. In a practical embodiment, those two resistors were selected to have a value of about 50,000 ohms so that the network including the associated capacitor had a time constant of one second, which is large relative to the normal interval between the charging of the capacitor and the time at which the firing circuit will be triggered to apply the pulse of energy to the ignitron. However, at the termination of the operation, when switch NWCR is opened, those resistors serve to discharge their associated capacitor as a safety measure.

The gate signals for the controlled rectifier devices 1CRE and 2CRE are applied through pulse transformers T3 and T4, respectively. Any pulse appearing across the secondary winding of transformer T4, for example, which is of a polarity such that the left-hand end of that winding is positive relative to the right-hand end, is dissipated through rectifier 20RE and resistor 74R. A pulse of the opposite polarity is applied to the input or gate circuit of controlled rectifier 2CRE via resistor 74R to cause that device to apply a discharge pulse from capacitor 21C to the input circuit of ignitron IG2, as above described. The network comprising capacitor 23C and resistors 74R and 75R are elements of a circuit for filtering high-frequency spurious transients and for effectively preventing improper actuation of the controlled rectifier device by transients. The gating pulses applied through transformer T4 are of sufficient magnitude to produce gating of the device despite this filtering or desensitizing network. The other firing circuit operates in a similar manner.

The application of pulses to the pulse transformers T3 and T4 is controlled by the driving circuit comprising transistors Q17 and Q18 and the driving circuit comprising transistors Q19 and Q20, respectively. These driving circuits are controlled by a delayed firing system via conductor 10, by an ignitron anode voltage sensing system via a conductor 12, by a lead-trail control circuit which is connected to the two driving circuits via leads 14 and 16, respectively, and by a heat control circuit via conductor 17. As will be seen, in the illustrated arrangement, each of these leads may be at either of two selected voltages. In the illustrated arrangement these have been selected to be a positive voltage (such as positive 12 volts) and ground.

Conductor 10 is connected to the bases of transistors Q17 and Q19 through resistors 48R and 54R, respectively; conductor 12 is connected to the bases of those transistors through resistors 49R and 55R, respectively; conductor 14 is connected to the base of transistor Q17 through resistor 52R; conductor 16 is connected to the base of transistor Q19 through resistor 53R; and conductor 17 is connected to the bases of transistors Q17 and Q19 via resistors 50R and 51R, respectively.

The emitters of transistors Q17 and Q19 are grounded and their collectors are connected to a source of positive potential through load resistors 57R and 56R, respectively. Negative biasing voltages are applied to the bases of those transistors through resistors 78R and 79R, respectively. If any one of the conductors 10, 12, 14 or 17 is at the noted positive potential (assumed to be 12 volts), transistor Q17 is biased effectively to saturation, and similarly, if any one of the conductors 10, 12, 16 or 17 is at the noted positive potential, transistor Q19 is biased effectively to saturation. These input networks therefore constitute, in effect, "or" gates under which if any one of the noted conductors associated with transistor Q17 or Q19 is at its positive potential or state, the associated transistor is biased effectively to saturation. Under that condition, the collector of that transistor is at a relatively low potential, herein assumed to be ground potential. However, at the instant that all of the noted conductors associated with the transistor concurrently reach the lower (ground) potential, the voltage at the base of that transistor drops sufficiently to render that transistor effectively non-conductive. For example, whenever all of the conductors 10, 12, 16 and 17 concurrently reach ground potential, transistor Q19 is rendered non-conductive and as a result a positive-going pulse is applied through the capacitor 14C to the base of transistor Q20. The emitter of transistor Q20 is grounded, and the collector is connected to a source of positive potential through the primary winding of transformer T4 and via switch SW1. The base is connected to a source of negative potential through resistor 59R. As a result of the application of the positive pulse to the base, transistor Q20 conducts current from the positive source through switch SW1, and through the primary winding of transformer T4 so that a pulse is induced in the secondary winding of that transformer. The shape and duration of the pulse which is applied to the base of transistor Q20, and hence the shape and duration of the pulse applied to the controlled rectifier device 2CRE via transformer T4 is controlled by means including resistor 56R, capacitor 14C and the resistance of the base of transistor Q20. Rectifier 4RE serves to prevent any substantial negative voltage from being applied to the base of transistor Q20. Rectifier 19RE serves to dissipate the voltage which is induced across the primary winding of transformer T4 upon the collapse of the magnetic field at the termination of conduction of transistor Q20 at the end of the pulse.

The driving circuit including transistors Q17 and Q18 operates in a similar fashion, producing a pulse of energy at transformer T3 in the event that and when the voltages on conductors 10, 12, 14 and 17 all reach their lower or ground potential. It will be noted that switch SW1 also controls the application of positive voltage to the collector of transistor Q18. This switch is provided as a further safety measure and preferably is a contact of or is controlled by the weld-no-weld switch customarily provided in resistance-welder timers and which must be closed in order for welding to proceed. Whenever that switch is open, the driving circuits are incapable of applying pulses through transformers T3 and T4 to the firing circuits.

The lead-trail circuit controls, via conductors 14 and 16, which of the two driving circuits and hence which of the two firing circuits can operate at any time, and alternately enables those circuits. This circuit is energized via a transformer, the primary winding T10P of which is illustrated to be connected across the source S1 and the secondary winding T10S of which appears at the lead-trail control block. When the upper terminal of the secondary winding T10S is positive with respect to the grounded center tap, which occurs when the left-hand terminals of source S1 and primary winding T10P are positive relative to their other terminals, current flows and the voltage drops from a positive level effectively to ground potential. This voltage is applied via conductor 14 and through resistor 52R to the base of transistor Q17 in the driving circuit associated with ignitron IG1. This is an enabling signal, which, other conditions met, will permit the firing circuit associated with ignitron IG1 to fire that ignitron, and it will be observed that this occurs during the half cycle in which the anode of ignitron IG1 is positive with respect to its cathode.

During the same half cycle, the lower terminal of transformer secondary T10S is negative with respect to ground and a positive voltage (e.g., 12 volts) is applied via conductor 16 and through resistor 53R to the base of transistor Q19 to disable that driving circuit and the firing circuit including controlled rectifier 2CRE to fire ignitron IG2.

The lead-trail control is arranged so that the potential on lead 14 is taken effectively to ground early in the half cycle of the line voltage, approaching quite closely the zero-degree point and remains at that voltage throughout essentially the complete half cycle. During the alternate half cycle the control causes the potential on lead 14 to be positive.

The lead-trail control operates continuously whenever the source S1 is connected so as alternately to enable during successive half cycles the firing circuits associated with ignitrons IG1 and IG2. In order to control when welding occurs and additionally to provide a means for effectively preventing firing during the first half cycle thereafter so as to prevent saturation of certain types of welding transformer cores, a delayed firing system is provided. The delayed firing system is actuated by a weld signal applied to conductor 20. An appropriate signal is conventionally available in timers associated with present commercial welding equipment. This signal normally is applied when the timer has been set and desirably is synchronized with the voltage from source S1 so that the operating signal is both applied and removed at the zero degree points of the source voltage. In the illustrated arrangement, it is assumed that the weld signal applied to conductor 20 is at an appropriate positive value (e.g., 12 volts) and that the conductor 20 is grounded in the absence of a weld signal.

Since the weld signal appears at the beginning of the weld interval, the delayed firing circuit will be effective during the first half cycle of the line frequency, only, to prevent firing of either of the ignitrons for a preselected interval even though other elements of the circuits may indicate that welding may proceed. It is presently believed that the optimum delay period is 87½° after the zero degree point of the sign wave of the source S1 at which the weld signal is applied to conductor 20. This interval may be varied to accommodate variations in the power factor of the load by suitable adjustment controls. It is desirable, however, that the magnitude of the delay be quite precisely selectable so that the system provides extremely precise timing of the interval between the application of an appropriate potential to the weld line 20 (at the zero degree point) and the instant at which the firing circuits are enabled to fire during the first one-half cycle of operation.

It should again be noted that this delayed firing system does not necessarily cause firing of the ignitrons but merely establishes a minimum firing angle for the first half cycle, and that after the first half cycle of any weld, it is ineffective to interfere with the free selection of the firing points of the ignitrons.

The heat control circuit, comprising transistors Q10 through Q16, selectively controls the firing angles of the ignitrons IG1 and IG2 to control the percent heat and hence the magnitude of the energy delivered to the workpiece WP. In general, the heat control has a capacity to produce firing of those ignitrons at any selected phase angle provided the other conditions established by the circuitry are met. Among those other conditions, of course, in the illustrated arrangement, is that if the heat control be set to fire the ignitrons at a phase angle less than a selected value in the order of 87½°, no such firing will occur during the first half cycle of the weld until after that minimum delay angle which is established by the delayed firing system.

The alternating current signal appearing across the secondary winding T10S is synchronized with the source S1. This signal is full-wave rectified by rectifiers 10RE and 11RE and applied through resistor 65R to one electrode of rectifier 15RE, the other electrode of which is connected to a source of negative potential. Rectifier 15RE prevents the voltage on conductor 32 from becoming more negative than a selected value, such as negative 12 volts. If the magnitude of the voltage of the negative peaks of the full-wave rectified signal be large relative to that selected negative 12 volt value, then the voltage on conductor 32 will be in the form of a negative 12 volt signal with a positive-going (to ground) spike each 180°.

This signal is applied through resistor 72R at the base of transistor Q10, that base being connected to a suitable source of positive potential through resistor 82R. Transistors Q10 and Q11 are interconnected as a multivibrator in a form of Schmitt trigger circuit, with the collector of transistor Q10 being coupled to the base of transistor Q11 via a network comprising capacitor 25C and resistors 44R and 22R, and with the emitters of the two transistors being coupled via resistor 63R. When the voltage on conductor 32 is at the negative 12 volt level, transistor Q10 is held in a non-conductive state and transistor Q11 is conducting. At the positive-going input signal applied via conductor 32 to the base of transistor Q10, transistor Q10 begins to become conductive and as a result of the coupling between transistors Q10 and Q11, transistor Q10 becomes fully conductive very rapidly and transistor Q11 is driven below cutoff. The magnitude of the input voltage to the base of transistor Q10 at which this triggering will occur is quite precise and repetitive and the point at which the triggering occurs in relation to the voltage of source S1 can be precisely selected by selection of the parameters of the trigger circuitry, by selection of the turns ratio of transformer T10 to control the magnitude of the A.C. voltage across secondary winding T10S, and by selection of the magnitude of the negative biasing voltage applied to rectifier 15RE. In a constructed arrangement, with 115 volts across the secondary winding T10S, the circuit comprising transistors Q10 and Q11 was accurately triggered 10° in advance of the zero degree point (and the 180° point) on the A.C. wave form, transistor Q10 being rendered conductive and transistor Q11 being rendered non-conductive.

The trigger remains in this condition until the positive signal diminishes toward the selected negative 12 volt point and in the constructed embodiment, this occurred at about 10° after the zero degree point (and the 180° point) of the wave form of the source S1. At that time, transistor Q10 again becomes non-conductive and transistor Q11 again becomes conductive. When transistor Q11 is conducting, its collector voltage is at a relatively low value, approaching ground. When transistor Q11 is non-conductive, at each pulse on conductor 32, its collector voltage is at a higher voltage such as 12 volts positive. Consequently, during the operation of the circuit, conductor 34 is supplied 120 times per second with a positive-going (from ground to positive 12 volts) essentially square-wave pulse of relatively short (e.g., 20°) duration and having its leading edge accurately related to and in advance of (e.g., 10°) of the zero degree point (and 180° point) on the AC wave form of source S1.

These pulses are applied to the base of transistor Q12 by a network comprising capacitor 9C and resistors 61R and 45R. Transistor Q12 is rendered conductive by each such pulse to apply a corresponding series of negative-going pulses to a multivibrator circuit comprising transistors Q14 and Q15 via a network including capacitor 10C and rectifier 5RE. Transistor Q14 is normally conducting and transistor Q15 is normally cut off.

The base of transistor Q14 is taken negative by these negative going pulses. Transistors Q14 and Q15 are cross-coupled to form a flip-flop or multivibrator circuit, with the collector of transistor Q14 being coupled to the base of transistor Q15 by the network comprising capacitor 16C and resistor 28R and with the collector of transistor Q15 being coupled to the base of transistor Q14 by capacitor 15C and resistor 27R. The collectors of transistors Q14 and Q15 are connected to a source of positive potential through load resistors 16R and 15R, respectively, the bases of those transistors being respectively connected through resistors 36R and 37R to a source of negative potential, and the emitters being grounded. Transistors Q14 and Q15 conduct alternatively and desirably, means are provided for insuring that prior to the receipt of the described pulse, transistor Q14 is conducting effectively to saturation while transistor Q15 is cut off. The cut off of transistor Q15 to restore conduction in transistor Q13 and reduce the potential on lead 17 effectively to ground is the means to enable the drive circuits of transistors Q17, Q18 and Q19, Q20 so that one of the two ignitrons IG1 and IG2 fire to apply welding current to the work piece.

The ignition drive circuits are disabled by transferring transistor Q15 to conduction slightly ahead of the beginning of each half cycle of line voltage (e.g., 10°) and are enabled at the time the transistor Q15 is cut off as determined by the time constant of the resistance-capacitance network controlling unijunction transistor 2UJ. This network can be adjusted manually and can be regulated to provide either a constant current welding mode or a constant voltage welding mode.

At each of the short-duration negative-going pulses applied to the base of transistor Q14 by transistor Q12, transistor Q14 is turned off and transistor Q15 is turned on. When transistor Q15 is triggered to its conductive state, its collector voltage falls essentially to ground potential and this voltage is applied via conductor 15 and a network including resistors 43R and 47R to the base of transistor Q13 to block conduction in that transistor. As a result, the collector voltage of transistor Q13, at conductor 17, is approximately 12 volts positive. This signal is applied through resistor 50R to conductor 18 to disable the driving circuit comprising transistors Q17 and Q18 and is applied via resistor 51R to conductor 19 to disable the driving circuit comprising transistors Q19 and Q20. It will be noted that this occurs slightly (e.g., 10°) before the cycle commences.

When transistor Q14 is rendered non-conductive just prior to the beginning of a cycle, the potential at its collector rises and, if double pole double throw switch DPDT1 is in the position shown, is applied across the network comprising variable resistors VR2 and VR3, resistor 29R, and capacitor 2C. Capacitor 2C charges at a rate determined by the resistance of the charging circuit. Variable resistors VR2 and VR3 are provided to permit selection of the percent heat and the power factor adjustment, respectively. Resistor 29R establishes the maximum heat for which the system can be set, with VR2 and VR3 set to their minimum resistance positions.

Alternatively, when the system is transferred from the unregulated or manual heat control to a regulated heat control switch DPDT1 is transferred to its lower contacts to connect the regulator circuit comprising transistors Q21 to Q23 to variable resistor VR4, resistor 29R and capacitor 2C. In this connection the regulator circuit augments the signal providing the base from which the capacitor 2C charges to the firing potential of 2UJ according to the level of the weld primary current or the welding electrode voltage. As shown in FIG. 2 by the curve A the charging curve of condenser 2C has a given slope which is essentially a straight line if considered near the origin for a given amount of series resistance. The charging period required to reach breakdown for 2UJ with no potential initially imposed is represented by the distance along the time axis from the origin to the point B. When an intermediate base potential is established as represented by curve C, the charging interval required to reach the breakdown of 2UJ is reduced to that represented by D-B on the time axis. A reduction in this interval causes the ignitrons to be fired earlier in their cycle and increases the welding current applied to the work piece. With transistor Q14 conducting at saturation its collector is at effective ground and no base potential or initial charge level is present in capacitor 2C. Hence with DPDT1 in the position shown a starting point at the origin is established and alterations in the charge period are accomplished through changes in the slope of the charging curve A by changes in the resistors VR2 and VR3. For regulated operation, however, the slope of the curve can be adjusted by adjustment of variable resistor VR4 and the base level is altered by the deviation of the monitored signal from a reference level to change the voltage level at junction 35. The primary control of this reference level is achieved by setting the level of the reference signal by adjustment of VR6. This adjustment is the heat control when automatic regulation is employed. A limit on the reference level magnitude is established by adjustment of VR8 which corresponds to a power factor adjustment. Initial heat adjustment and some up slope control are provided by variable resistor VR7 which determines the amount of initiating signal initially applied in opposition to the reference signal and the rate of decay of that signal. The sensitivity or amount of feedback signal applied in opposition to the reference signal to produce a net error signal is determined by adjustment of variable resistor VR5. Variable resistor VR9 allows adjustment of the monitored welding electrode voltage signal to a level compatible with the primary welding current signal as fed to the primary of coupling transformer T11.

The welding circuit can be monitored in the constant current mode by monitoring the primary welding current through current transformer CT having its primary in series with the primary of the welding transformer WT. Welding electrode potential can be monitored to regulate in the constant voltage mode by leads 41 and 42 connected across the welding electrodes. Each monitoring means is selectively connected to the regulator circuit through double pole double throw switch DPDT2 and a coupling transformer T11. Switch DPDT2 is shown in the drawing connected for constant current regulation.

When monitoring the welding electrode voltage connections are made adjacent the faces of the electrodes engaging the workpieces to provide a conductive pick up. In order to provide clearance for the workpieces the leads from those connections are so oriented that they are inductively coupled to the welding current conductors to the welding electrodes. In order to suppress the inductively coupled signal a relatively low resistance 89R is connected across the monitoring leads and the conductively applied signal from the pick up connections is sensed across this electrode. The coupling of the monitoring leads and the welding conductors is minimized by the geometry chosen, hence this coupling is quite loose. It has been found that the low resistance, 0.5 ohm and 1 ohm have been used, effectively suppresses whatever signal is induced, presumably by permitting the development of a counter flux due to the relatively low resistance loop provided. The resistance between the welding electrodes ordinarily is about 500 micro ohms. The conductive circuit is effectively supplied from a constant current source hence the current through 89R provides an accurate representation of the voltage drop across the electrodes far in excess of the current induced in the pick up circuit. This conductive current is effective in the primary of coupling transformer T11.

In order to adjust the electrode voltage signal to the primary of T11 to a magnitude compatible with the primary welding current signal derived from current transformer CT, variable resistor VR9 is provided. This resistor should be of a value to achieve the results discussed and therefore should be considered as part of the total resistance across the pick up leads.

The alternating signal derived from the secondary of transformer T11 is rectified in bridge 43 and filtered by choke CH3 and condenser 26C to produce a smooth DC signal across resistor 91R and variable resistor VR5. This signal is added algebraically to a reference signal derived from an AC source as through secondary T10S, rectified as by 29RE to a series of negative going pulses which are smoothed by condenser 27C and clipped by the breakdown or zener diode 1BD to develop a negative voltage to ground across variable resistor VR6. The reference signal desired for a given welding operation is established by the adjustment of VR6 to establish a negative voltage to ground to which the feedback signal from the weld monitoring means is added. Since the reference adjustment provides the base for the input signal to the regulator it affords the heat adjustment means by providing a primary adjustment of the base potential from which charging of condenser C2 is initiated and thus in large part determines the interval required to reach the firing point for the ignitrons following the transfer of Q14 to a non-conducting condition. The amount of feedback signal applied to the base of transistor Q21 and the net or error signal level is determined by adjustment of variable resistor VR5. Ordinarily this adjustment is made in the set up of the operation and its control is not readily available to the machine attendant.

The net or error signal derived from the reference signal and weld feedback signal is applied to the base of transistor Q21 connected in the common collector configuration to provide a high input impedance. This signal passes through isolation resistance 92R. Rectifier 31RE prevents the base going negative with respect to ground. Transistor Q21 has its collector connected to a positive source and its emitter connected through resistor 97R to ground. The output signal as developed in the emitter follower is applied to the base of transistor Q22 and amplified therein as a signal derived at the collector. The collector is connected through load resistor 96R to a source of positive voltage. A temperature sensitive resistor TR is connected between the emitter of transistor Q22 and ground to stabilize its characteristics with temperature variations.

Changes in the output or regulating signal from transistor Q22 are controlled by the rate sensitive feedback circuit comprising capacitor 28C and resistor 95R coupling the output signal from the collector of transistor Q22 to the base of transistor Q21. This circuit controls the rate of correction by the regulator and avoids excessive overshoot in the correction.

The more negative the net signal applied to the base of transistor Q21 the more negative the base of transistor Q22 and the more positive the collector of transistor Q22. Accordingly, the displacement of heat adjustment variable resistor VR6 toward its negative end increases the potential at resistor 98R. A change in the feedback signal from the secondary of transformer T11 will be reflected in an inverted change of potential at resistor 98R since an increase in the feedback signal will make the net signal more positive to transistor Q21 base and increase the voltage drop in load resistor 96R. Conversely a decreased feedback signal will decrease the drop.

In addition to the limits on the rate of these changes in voltage at transistor 22Q collector by the rate sensitive feedback circuit, an absolute limit on the voltage level is afforded by rectifier 32RE and variable resistor VR8. Resistor VR8 develops a positive voltage to ground which is applied to rectifier 32RE to reverse bias that rectifier at the voltage limit. Any positive voltage at junction 43 in excess of that limit is passed to ground. Variable resistor VR8 thereby provides a limit on the basic voltage which can be developed in the regulator circuit for application to the junction 35 and thus the establishment of an upper limit on the voltage base from which the charging of condenser toward the firing potential of unijunction transistor 2UJ is initiated. This adjustment constitutes the power factor adjustment.

With the regulator as described the maximum heat is applied to the workpiece during the initial portion of the weld heat time since the maximum negative net signal is applied to the base of transistor Q21. This signal results from the negative reference signal and the absence of any bucking signal in the feedback circuit from the welder due to the absence of weld current in the welder at the initiation of the weld. In some applications this initial maximum heat is advantageous as where the work pieces being welded have an insulating surface film. However in other applications it may be quite undesirable and superior welds can be achieved only by insuring that a lower level of welding current is drawn initially and thereafter the current is increased to some desired level. This current pattern is achieved through the weld initiation control including transistor Q23 by closing switch SW3 to supplement the net signal passed by resistor 92R with an initial positive voltage which diminishes with time.

When a positive going weld signal is applied at lead 20 it is passed through resistors 99R and 100R to overcome the negative bias applied to transistor Q23 base from the source of negative voltage connected to the base through resistor 100R and to make that base sufficiently positive to drive the transistor effectively to saturation. The emitter of transistor Q23 is grounded and the collector is connected to a source of positive potential through load resistor 101R. When transistor Q23 saturates, its collector effectively goes to ground permitting the condenser 29C, which was charged during the time transistor Q23 was cut off through the path from the positive voltage source, resistor 101R, and rectifier 34RE, to discharge through variable resistor VR7 and through switch SW3, rectifier 30RE, resistor 102R, the base emitter circuit of transistor Q21 and resistor 97R to ground. Rectifier 34RE blocks the discharge path to the transistor Q23 and isolation resistor 92R effectively eliminates the path through the feedback and reference voltage sources. Resistor 102R and rectifier 30RE restrict the current from the rate sensitive feedback circuit of resistor 95R and condenser 28C. An initial positive voltage is applied to the base of transistor Q21 which diminishes according to the time constant determined by the resistance-capacitance combination to limit the level from which condenser 2C is charged and set the firing time of the ignitrons back from that which would prevail if only the reference signal were applied.

Adjustment of variable resistor VR7 establishes the magnitude of the voltage initially applied to the base of transistor Q21 and thus the initial firing delay of the ignitrons IG1 or IG2. It also controls to some extent the slope of the increasing welding current by its control of the decay of the voltage it imposes on the base of transistor Q21.

Thus for a given adjustment of the regulator an increase in the monitored signal caused by an increase in welding current or an increase in secondary electrode voltage will increase the net signal to transistor Q21 and result in a decrease in the potential at condenser 2C which ultimately delays the firing of the ignitrons and results in a decrease of the welding current or the welding electrode voltage. Conversely, a decrease in the monitored signal advances the firing of the ignitrons and increases the welding current or welding electrode voltage.

The voltage on condenser 2C is applied through junction 35 to the emitter of unijunction transistor 2UJ, one base electrode 44 of which is connected to a source of positive potential through resistor 2R. The other base electrode 45 of that double-base diode device is connected to ground through a resistor 3R. When the voltage across capacitor 2C rises to a sufficient value, the impedance of the unijunction device 2UJ between the emitter and base electrode 45 abruptly falls and capacitor 2C discharges over a path including the emitter, base 45 and resistor 3R. This applies a positive-going pulse to the base of transistor Q16 through a network comprising resistors 13R and 39R and capacitor 12C. Transistor Q16 is rendered conductive and desirably saturates, and its collector voltage drops from, say, 12 volts to approximately ground potential to develop a negative-going pulse which is applied through capacitor 11C and rectifier 6RE to the base of transistor Q15 to restore the trigger circuit comprising the transistors Q14, Q15 back to its original state. The reestablishment of conduction in transistor Q14 effectively removes the charging source for capacitor 2C. The termination of conduction through transistor Q15 results in the application of a more positive potential via conductor 15 and resistor 43R to the base of transistor Q13 to cause that device to become fully conductive. As a result, its collector voltage at conductor 17 drops substantially to ground potential which is communicated to conductors 18 and 19 through resistors 50R and 51R to enable the driving circuits and the firing circuits to fire the ignitrons IG1 and IG2, as far as this control is concerned. As will be seen, in the normal operation of the circuit, all of the other conditions enabling one of the two firing circuits to operate have normally been met prior to the receipt of this heat-control signal so that normally it is the application of ground potential to conductor 18 or 19 which actually produces the firing of the appropriate one of the two ignitrons IG1 and IG2.

The ignitron anode voltage sensing equipment serves to overcome that which has been a serious disadvantage of separate excitation types of firing systems. The apparatus thus far described will function satisfactorily but is subject to possible misfiring with highly inductive loads. Thus, if the load current trails the load voltage due to the inductive reactance of the load, the ignitron which is fired during one-half cycle may continue to conduct even though the phase of the line voltage has reversed. Under this circumstance the voltage across the second ignitron may not rise sufficiently to permit firing of that ignitron until some time after the line voltage itself actually switches polarity. If this condition exists, it is possible for the system to misfire since the self-excitation firing system would discharge capacitor 20C or 21C into the ignitor circuit at the appropriate time even though the anode voltage of the associated ignitron may not have risen sufficiently to permit firing, and it is possible for the energy stored in the capacitor to be fully dissipated before the anode voltage rises adequately to permit conduction in the ignitron. The ignitron anode voltage sensing system obviates this possible malfunctioning.

Upon the closure of the no-weld control switch NWCR (FIG. 1) primary winding T5P is connected between the anodes of the two ignitrons IG1 and IG2 in series with a pair of protective fuses. The voltage across that winding will therefore vary in accordance with the difference between the voltages at the anodes of the two ignitrons. When the anode voltage of either ignitron rises with respect to the other, a voltage is induced across the secondary winding T5S, and the ignitron anode voltage sensing control transfers the voltage on lead 12 from positive 12 volts essentially to ground potential. This voltage is applied to the bases of transistors Q17 and Q19 to enable both of those driving circuits to actuate their associated firing circuit. However, this does not occur until the voltage between the anodes of the two ignitrons has actually changed and been sensed so as to prevent the above noted misfiring.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

Having described the invention, I claim:

1. A welding system having a pair of ignitrons connected in anti-parallel relation between a source of alternating current energy and a load, separate-excitation firing means for applying pulses of energy to the input circuits of the ignitrons in selected phase relation to the source, a controllable actuating means for said firing means, a first feedback signal source responsive to the current from said ignitrons to said load, a second feedback signal source responsive to the voltage drop across the work pieces being operated upon by said system, a reference signal source, means for selectively combining one of said feedback signal sources with said reference signal source to produce an error signal, inhibiting means operable in synchronism with the alternating source for inhibiting said actuating means, interval defining means for rendering said inhibiting means effective for a given interval extending from the initiation of a half cycle of energy from said alternating source, and means responsive to said error signal for adjusting the given interval of said interval defining means.

2. In a system having a pair of anti-parallel connected unidirectional current conducting devices actuatable in response to input signals to connect a source of electrical energy of alternating polarity to a load circuit, the combination of a separate-excitation firing circuit means for each of the unidirectional current conducting devices each comprising a source of energy and controllable means effective when actuated for applying a pulse of energy from said source of energy to the input circuit of the associated unidirectional current conducting device, actuating means for selectively actuating said controllable means, inhibiting means for said actuating means, interval defining means operated in synchronism with the source of alternating energy effective during each half cycle of said energy for an adjustable portion of said half cycle extending from the initiation of said half cycle for maintaining said inhibiting means effective, and means responsive to the output of said unidirectional current conducting devices to said load circuit for controlling said interval defining means to establish the length of the initial portion of said half cycle said inhibiting means is effective whereby the terminal portion of said half cycle is lengthened in response to a reduction in the output of said unidirectional current conducting devices and shortened in response to an increase in the output of said devices.

3. A combination according to claim 2 wherein said load is a welding transformer having a primary and secondary winding and said output responsive means responds to the current in the primary winding of said welding transformer.

4. A combination according to claim 2 wherein said load is a pair of electrodes in engagement with a workpiece to be welded, and said output responsive means responds to the voltage between said electrodes.

5. A combination according to claim 2 wherein said load is a pair of welding electrodes in engagement with a workpiece to be welded, a monitoring contact to each electrode to monitor the voltage between said electrodes, leads to said monitoring contact inductively related to the welding circuit, a resistance of the order of an ohm connected across said leads to swamp out induced current therein while developing a voltage drop representative of the conducted current from said electrodes, and said output responsive means responds to the voltage across said resistance.

6. A combination as recited in claim 2 including a first feedback signal source responsive to the current between the unidirectional current conducting devices and said load, a pair of welding electrodes as a portion of said load, conductors to said electrodes, a second feedback signal source conductively associated with said welding electrodes responsive to the voltage across said electrodes, leads from each of said electrodes inductively related to the conductors to said electrodes, a low resistance across said leads, a transformer having a high primary impedance with respect to said resistance, and means for selectively sensing the feedback signal from said first source or from across a portion of said low resistance as representative of the output of said unidirectional current conductive devices.

7. In a system having a pair of anti-parallel connected unidirectional current conducting devices actuatable in response to input signals to connect a source of electrical energy of alternating polarity to a load circuit, the combination of a separate-excitation firing circuit, means for each of the unidirectional current conducting devices each comprising a source of energy and controllable means effective when actuated for applying a pulse of energy from said source of energy to the input circuit of the associated unidirectional current conducting device, actuating means for selectively actuating said controllable means, inhibiting means for said actuating means, interval defining means operated in synchronism with the source of alternating energy effective during each half cycle of said energy for an adjustable portion of said half cycle extending from the initiation of said half cycle for maintaining said inhibiting means effective, a reference signal source, a feedback signal source developing a signal which is a function of the output of said unidirectional current conducting devices to said load, means to combine said reference signal with said feedback signal to produce a difference signal, an initiating signal source which issues a signal which decays with time, means issuing an enabling signal for said controllable means, means to actuate said initiating signal means in response to said enabling signal, means to combine said initiating signal with said reference signal to produce an initial difference signal, and means responsive to said difference signals for controlling said interval defining means to establish the length of the initial portion of said half cycle said inhibiting means is effective.

8. A combination according to claim 7 wherein said load is a welding transformer including means for selectively preventing the combining of said initiating signal with said reference signal.

9. In a system having a pair of anti-parallel connected unidirectional current conducting devices actuable in response to input signals to connect a source of electrical energy of alternating polarity to a load circuit, the combination of a separate-excitation firing circuit, means for each of the unidirectional current conducting devices each comprising a source of energy and controllable means effective when actuated for applying a pulse of energy from said source of energy to the input circuit of the associated unidirectional current conducting device, actuating means for selectively actuating said controllable means, inhibiting means for said actuating means, interval defining means operated in synchronism with the source of alternating energy effective during each half cycle of said energy for an adjustable portion of said half cycle extending from the initiation of said half cycle for maintaining said inhibiting means effective, signal issuing means responsve to the output of said unidirectional current conducting devices to said load circuit for controlling said interval defining means to establish the initial portion of said half cycle said inhibiting means is effective and means responsive to the rate of change of the output of said unidirectional current conducting devices to said load circuit tending to reduce the rate of change of the signal from said signal issuing means which controls said interval defining means.

10. In a system having a pair of anti-parallel connected unidirectional current conducting devices actuatable in response to input signals to connect a source of electrical energy of alternating polarity to a load circuit, the combination of a separate-excitation firing circuit, means for each of the unidirectional current conducting devices each comprising a source of energy and controllable means effective when actuated for applying a pulse of energy from said source of energy to the input circuit of the associated unidirectional current conducting device, actuating means for selectively actuating said controllable means, inhibiting means for said actuating means, interval defining means operated in synchronism with the source of alternating energy effective during each half cycle of said energy for an adjustable portion of said half cycle extending from the initiation of said half cycle for maintaining said inhibiting means effective, means to develop a reference signal, means responsive to the output of said unidirectional current conducting devices to said load circuit for developing a feedback signal, means for combining said reference and said feedback signals to produce an error signal, and means responsive to the error signal for controlling said interval defining means to establish the initial portion of the half cycle said inhibiting means is effective.

11. A combination according to claim 10 wherein said load is a welding transformer coupled to welding electrodes, the interval defined by said interval defining means is an inverse function of the current in said welding electrodes, said reference signal tends to reduce said interval and said feedback signal tends to increase said interval whereby an increase in feedback signal decreases said weld current and a decrease in feedback signal increases said weld current.

References Cited

UNITED STATES PATENTS

| 2,071,860 | 2/1937 | Stoddard | 328—72 X |
| 2,472,043 | 5/1949 | Callender | 219—110 X |
| 2,848,595 | 8/1958 | Van Sciver | 219—110 X |
| 3,056,017 | 9/1962 | Peras | 219—110 X |

RICHARD M. WOOD, *Primary Examiner.*

B. A. STEIN, *Assistant Examiner.*